Oct. 31, 1950     D. B. DORSEY     2,527,800
CAMERA CONTROL

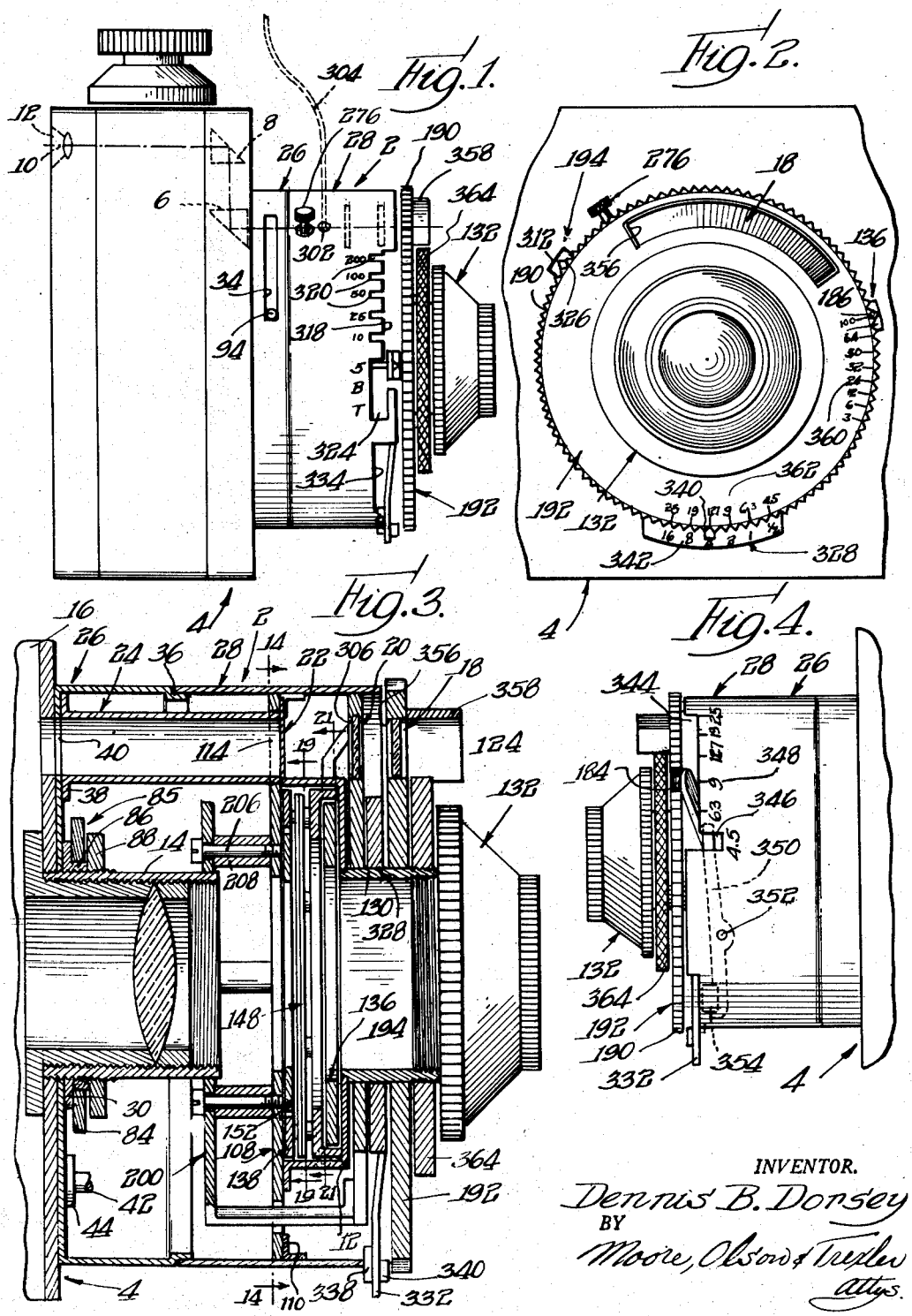

Filed Aug. 19, 1947     7 Sheets-Sheet 2

INVENTOR.
Dennis B. Dorsey
BY
Moore, Olson & Trexler
attys.

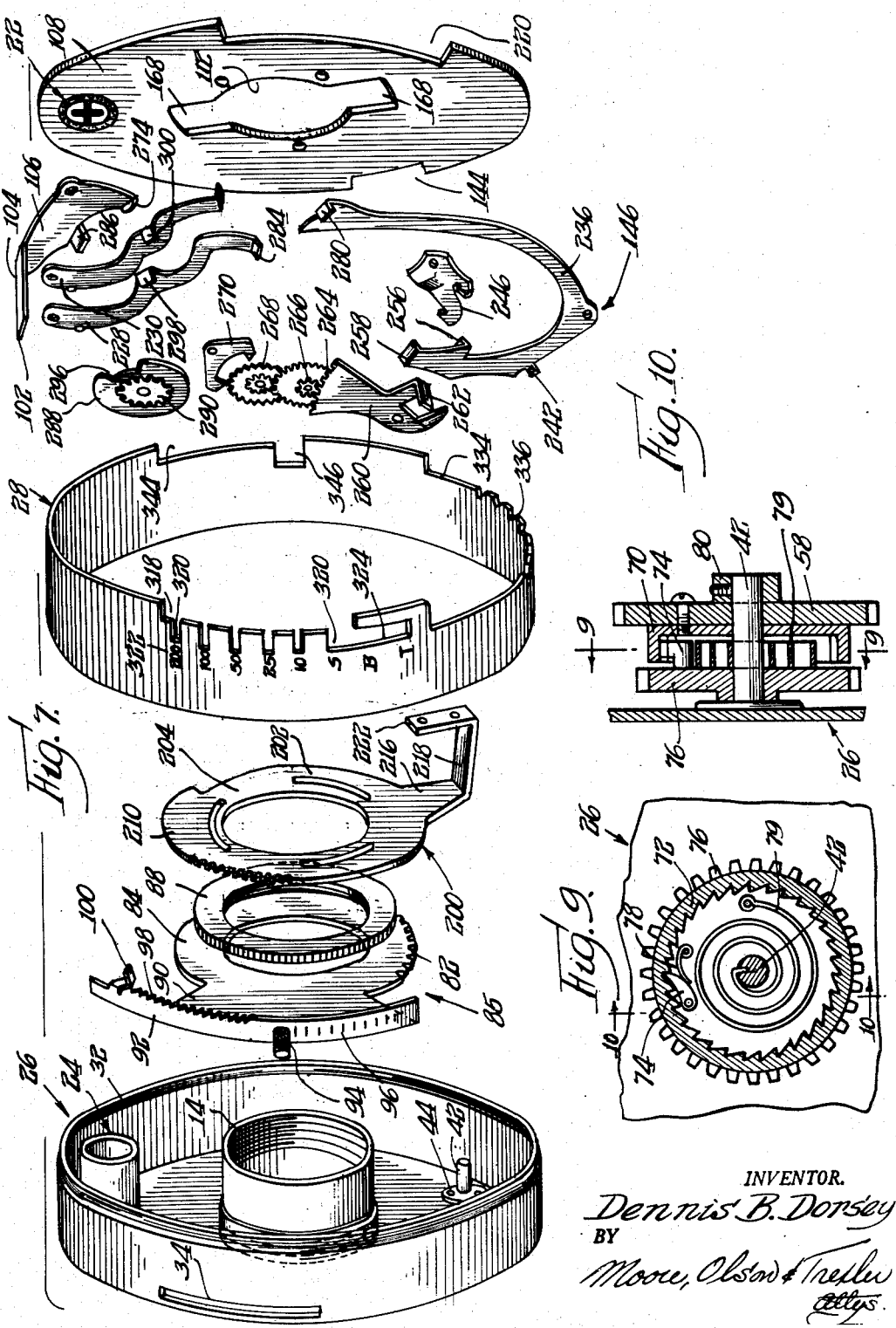

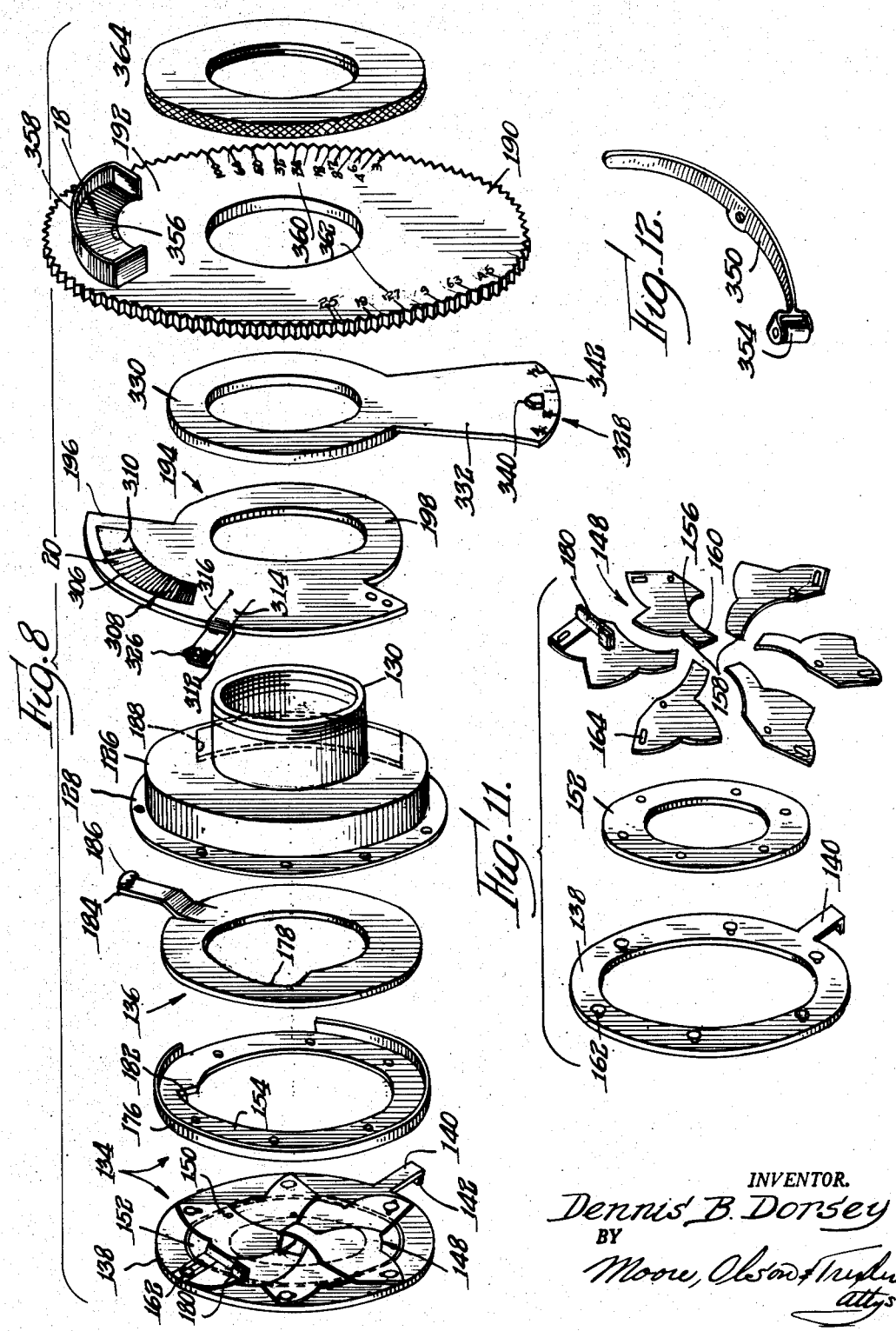

Oct. 31, 1950    D. B. DORSEY    2,527,800
CAMERA CONTROL
Filed Aug. 19, 1947    7 Sheets-Sheet 5
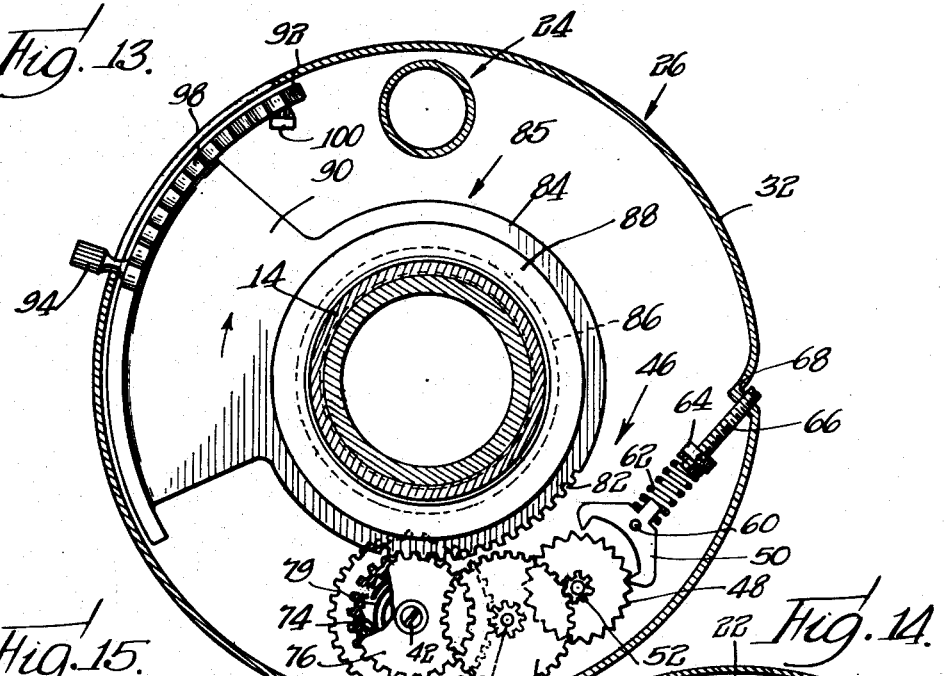
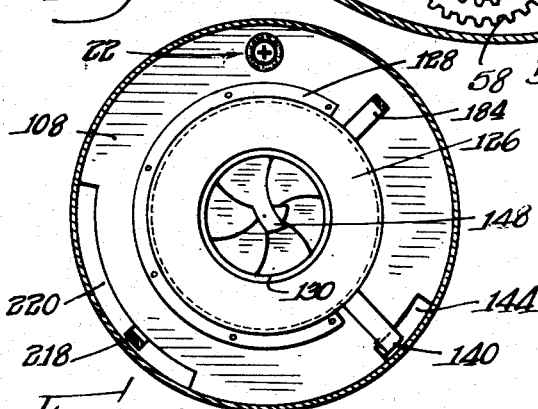
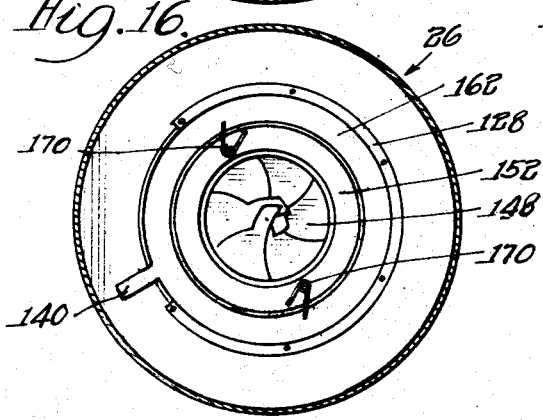
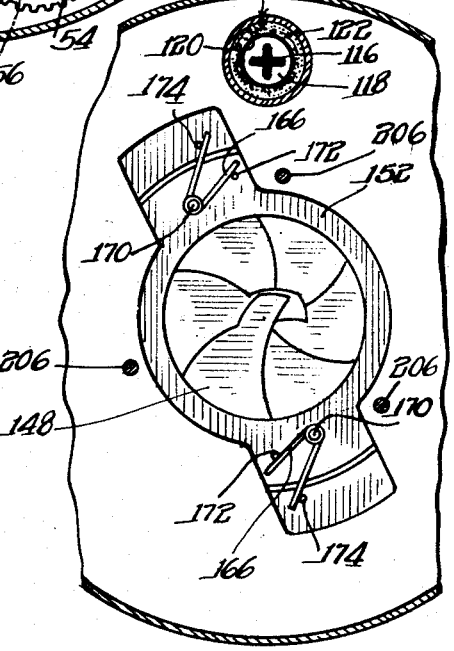
INVENTOR.
Dennis B. Dorsey
BY
Moore, Olson & Trexler
attys.

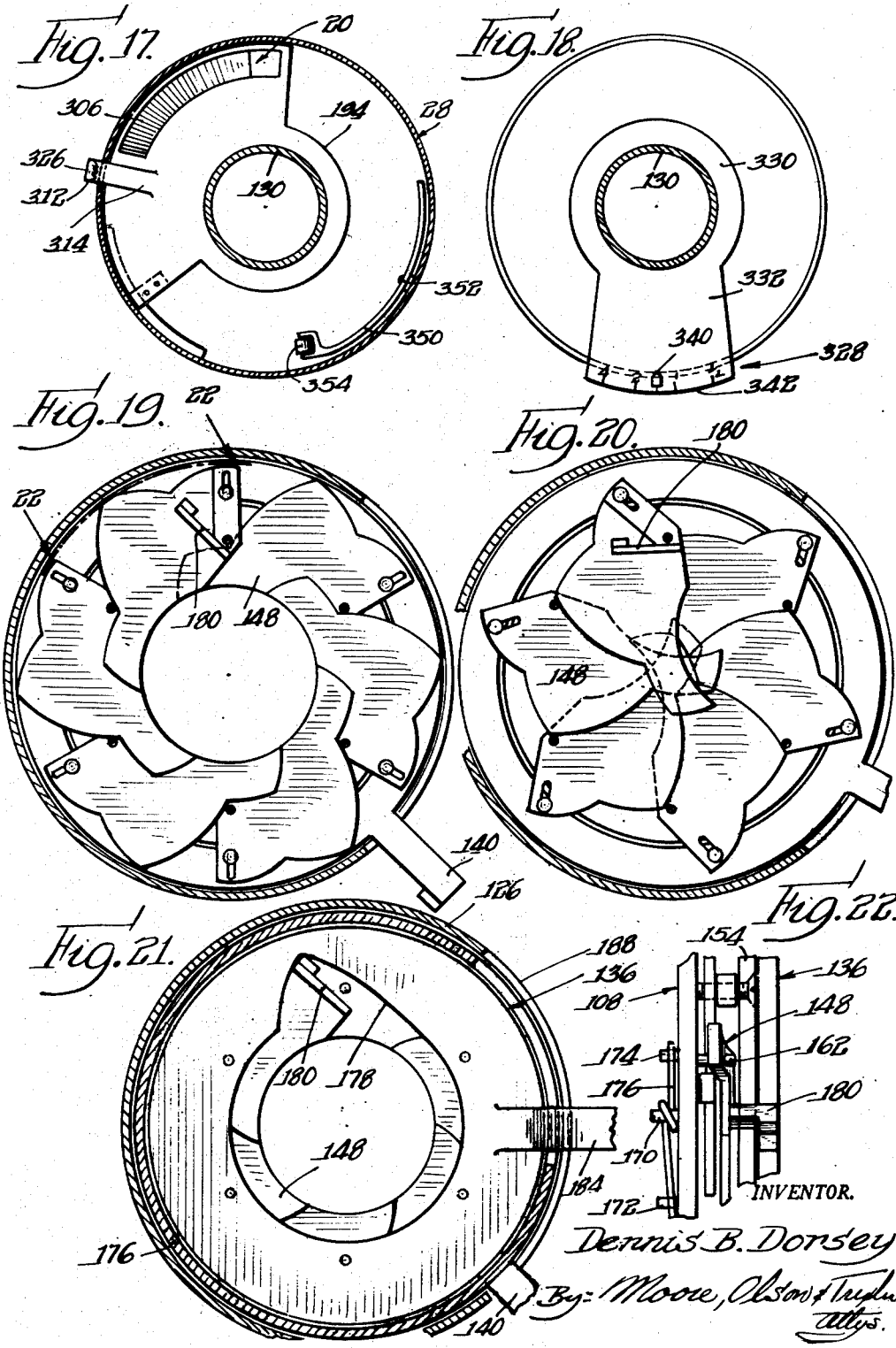

Oct. 31, 1950   D. B. DORSEY   2,527,800
CAMERA CONTROL
Filed Aug. 19, 1947   7 Sheets-Sheet 7
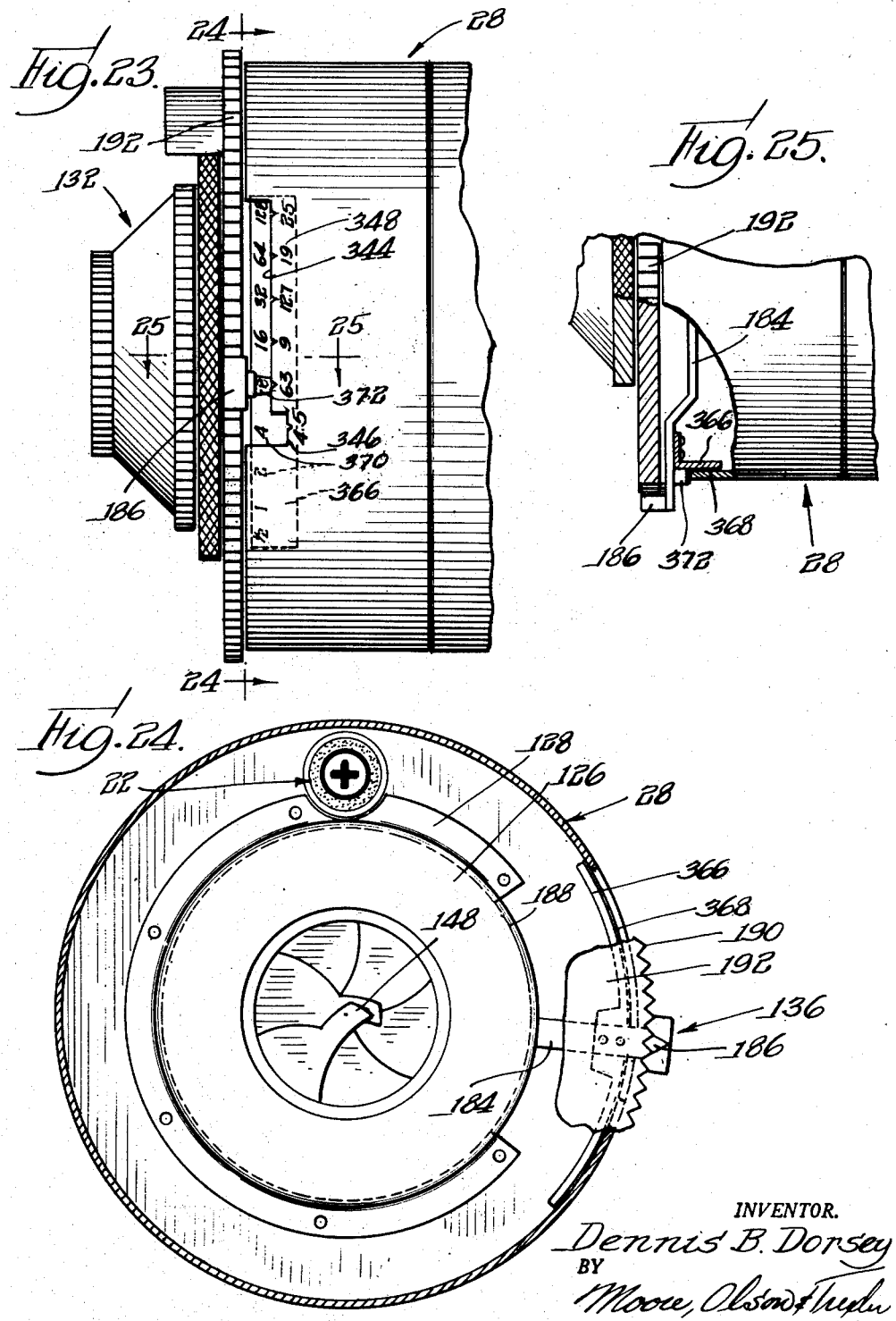

Patented Oct. 31, 1950

2,527,800

UNITED STATES PATENT OFFICE 2,527,800

CAMERA CONTROL

Dennis B. Dorsey, Chicago, Ill.

Application August 19, 1947, Serial No. 769,405

5 Claims. (Cl. 95—10)

This invention relates to camera controls.

It is a principal object of this invention to provide an automatic camera wherein means is provided for initially setting the control according to film speed ratings and means thereafter operable automatically to control the setting of the shutter opening in accordance with the adjustment of a member to determine the prevailing light conditions.

It is a further object of the invention to provide in such an automatic camera, means automatically varying the shutter opening in accordance with adjustment of the shutter speed and so constructed that setting of the shutter speed is automatically limited by the maximum and minimum shutter openings capable of being used under the prevailing light conditions.

It is a further object of the invention to provide in a camera having exposure metering means, means controlled by the metering means to determine the proper shutter openings and time intervals for the taking of time exposures.

A still further object of the invention is to provide in a camera having time exposure timer, means initiating the operation of the timer on opening of the shutter to take a time exposure and means automatically operable by the timer to close the shutter to terminate the time exposure.

A more specific object of the invention is to provide in an automatic camera light measuring means comprising a pair of light varying filters cooperating with a variable density screen, wherein one of the filters has portions of different range of light transmissibility and is connected to shutter speed control means, while the other filter has a single range of light transmissibility and is connected to shutter opening control means.

Other and further objects and advantages of the invention will be apparent from the following description when taken with the accompanying drawings wherein:

Fig. 1 is a view in side elevation of a camera provided with a control embodying the present invention;

Fig. 2 is a fragmentary enlarged view in front elevation of the camera control of Fig. 1;

Fig. 3 is a fragmentary view, partly in vertical section and partly in elevation, of the control of Fig. 1;

Fig. 4 is a fragmentary view in side elevation opposite that of Figure 1;

Figs. 7 and 8 are related views in exploded perspective showing certain essential parts of the control unit of Fig. 1;

Fig. 9 is a view in vertical section taken along the line 9—9 in Fig. 10;

Fig. 10 is a view in vertical section taken along the line 10—10 in Fig. 9;

Fig. 11 is a view in exploded perspective of a shutter assembly forming part of the camera control of Fig. 1;

Fig. 12 is a perspective view of a control means forming part of the camera control of Fig. 1;

Fig. 13 is a view in vertical section taken along the line 13—13 of Fig. 5;

Fig. 14 is a fragmentary view in vertical section taken along the line 14—14 of Fig. 5;

Fig. 15 is a reduced view in section taken along the line 15—15 of Fig. 5;

Fig. 16 is a reduced view in section taken along the line 16—16 of Fig. 5;

Fig. 17 is a reduced view in section taken along the line 17—17 of Fig. 5;

Fig. 18 is a reduced view in vertical section taken along the line 18—18 of Fig. 5;

Figs. 19 and 20 are views in vertical section taken along the line 19—19 in Fig. 3, the parts being shown in different positions in operation;

Fig. 21 is a view in vertical section taken along the line 21—21 of Fig. 3;

Fig. 22 is a fragmentary view in vertical section taken substantially along the line 22—22 in Fig. 19;

Fig. 23 is a fragmentary side elevational view similar to Fig. 4, showing a second embodiment of the invention;

Fig. 24 is a sectional view taken on line 24—24 of Fig. 23; and

Fig. 25 is a detail sectional view taken on line 25—25 of Fig. 23.

Figure 5:
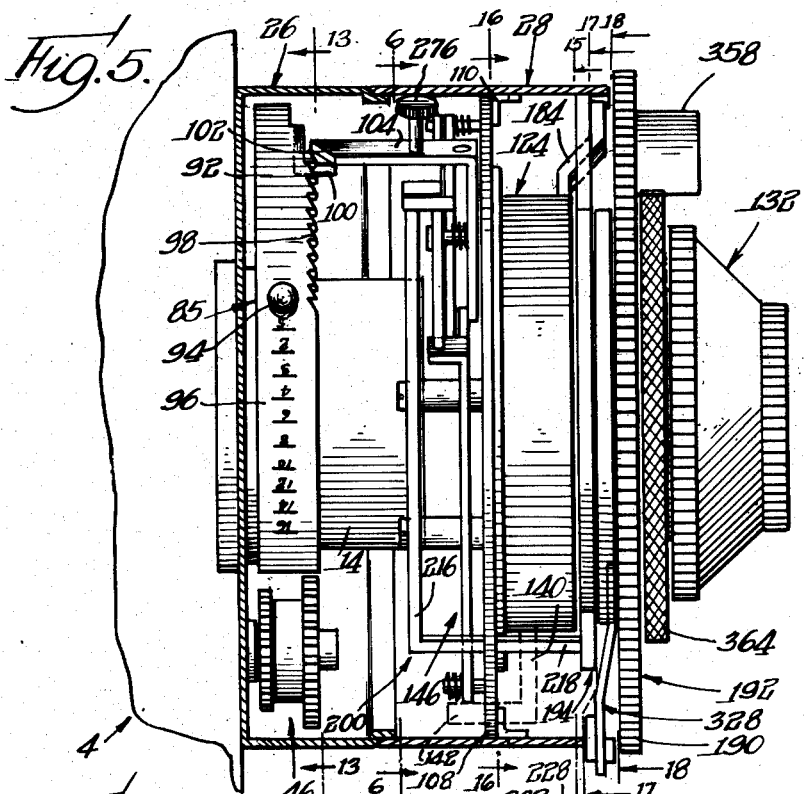
Fig. 5 is a fragmentary enlarged view of the control of Fig. 1 and with the housing being cut away and shown in vertical section to expose the parts mounted therein.

Although as shown in Fig. 1, the camera control unit 2 embodying the present invention is secured to a camera 4 having cooperating view finder prisms 6 and 8 and a viewing lens 10 with sight piece 12, it is to be understood that it may be secured to, or incorporated in, any camera having a lens tube 14, Fig. 3, projecting from the box 16, or bellows, of the camera. As shown best in Fig. 3, the camera control unit 2 preferably comprises an exposure meter unit consisting of a pair of light-measuring filters 18 and 20 cooperating with a translucent light measuring screen 22 and a viewing tube 24, the filter 20, screen 22 and tube 24 being mounted in an external housing comprising a rear part 26 and a forward part 28.

The rear housing or part 26 consists of a drum mounted on the lens tube 14 of the camera and secured against the front wall of the camera by a ring 30 threaded or press-fitted on the lens tube 14. The drum has an annular external flange 32 (Fig. 7) having an arcuate slot 34, and having its forward edge bent or spun inwardly to form a radial shoulder and an annular seat 36 for the forward part 28 of the housing. The viewing tube 24, Figs. 3 and 7, is provided at its inner end with an annular flange 38, spot welded or otherwise fastened to the drum in line with the opening 40 of the viewing tube. A mounting post 42, Figs. 7, 9 and 10, carries an annular flange 44, spot welded or otherwise fastened at the base of the drum.

A time exposure, interval timer 46, Figs. 5 and 13, is mounted in the rear part 26 of the housing. This time exposure timer preferably comprises an escapement wheel 48 controlled by an adjustable escapement 50 and controlling a series of the usual clock gears 52, 54, 56 and 58. A pin 60, secured to the base of the drum 26 forms a pivot for the escapement 50, controlled by a spring 62 which bears at one end against the escapement and at the other end against a collar 64 secured to a set screw 66 projecting from an opening in an indented portion 68 of the flange 32 of the drum. The set screw 66 may be adjusted to control the spring pressure on the escapement and hence the speed of the timing mechanism. The gear 58 is journalled on the post 42 (Figs. 7, 9 and 10), and has secured to it, as by pins or rivets, a drum 70, to the flange of which is secured an internally toothed ratchet 72. A pawl 74 cooperates with the ratchet 72 and is pivoted on a pin secured to a gear 76, also journalled on the post 42. A spring 78, secured to the gear 76, urges the pawl outwardly into engagement with the ratchet. A spiral spring 79, pinned at one end to the gear 76 and secured at its other end to the stationary post 42, urges the gear 76 in a clockwise direction, as seen in Figs. 9 and 13. The hub of the gear 76 and a collar 80 pinned to the outer end of the post 42, secure the parts in assembled relation on the post.

The gear 76 meshes with gear teeth 82 formed on the ring portion 84 of a time exposure control device 85, journalled on a reduced portion 86 of the ring 30, on which it is held against axial movement by a collar 88, fitted or threaded on the end of the ring 30. The ring 84, as best seen in Figs. 7 to 13, is formed with a radial arm or segmental portion 90, provided with an arcuate flange portion 92. An operating pin 94, secured to the flange 92, projects through the slot 34 of the drum 26, and the arcuate flange 92 is inscribed below the operating pin 94 with suitable timing indicia 96.

The forward edge of the arcuate flange 92 is formed with serrations or ratchet teeth 98 extending in a counter-clockwise direction from an inwardly bent and forwardly directed cam lug 100. The ratchet teeth 98 cooperate with a pawl 102, Figs. 5 and 7, formed on the outer end of the arm 104 of the shutter release 106.

The forward portion 28 of the housing comprises a cylinder, as best shown in Fig. 7, seated on the depressed flange 36 (Fig. 3) of the drum 26 and secured thereto in any convenient manner, as by a press fit or by suitable inter-engaging threads or by suitable fastening means, permitting detachment of the cylinder from the drum. A mounting plate or disk 108 is mounted centrally of the cylinder 28 and fastened thereto in any suitable manner, as by a flanged ring 110 secured to the disk and to the cylinder. The disk 108 is provided with a central opening 112, coaxial with lens tube 14, and a smaller opening 114, coaxial with, and receiving, the forward end of the viewing tube 24 of the exposure unit.

The light screen 22 consists of a translucent disk which is provided with a tri-density pattern or field of view, as best shown in Fig. 14, for the exposure unit. This tri-density pattern consists preferably of an opaque cross 116 upon a white or transparent background 118, surrounded by an opaque ring 120, in turn surrounded by a gray annulus 122.

A single diaphragmatic shutter mechanism 124 is utilized to determine both the size of the aperture opening and the timing of instantaneous exposures. This shutter mechanism preferably comprises a drum-shaped housing 126, best seen in Fig. 8, and has an annular flange 128 by means of which the housing is mounted on the forward face of the central mounting plate 108. The housing is provided with a central opening coaxial with the opening 112 in the plate 108 and with the lens tube 14. A front lens tube 130 is secured in that opening of the housing 126 and is internally threaded, as best seen in Fig. 3, to receive the externally threaded mounting stud of the usual front lens mount 132.

Figure 6:
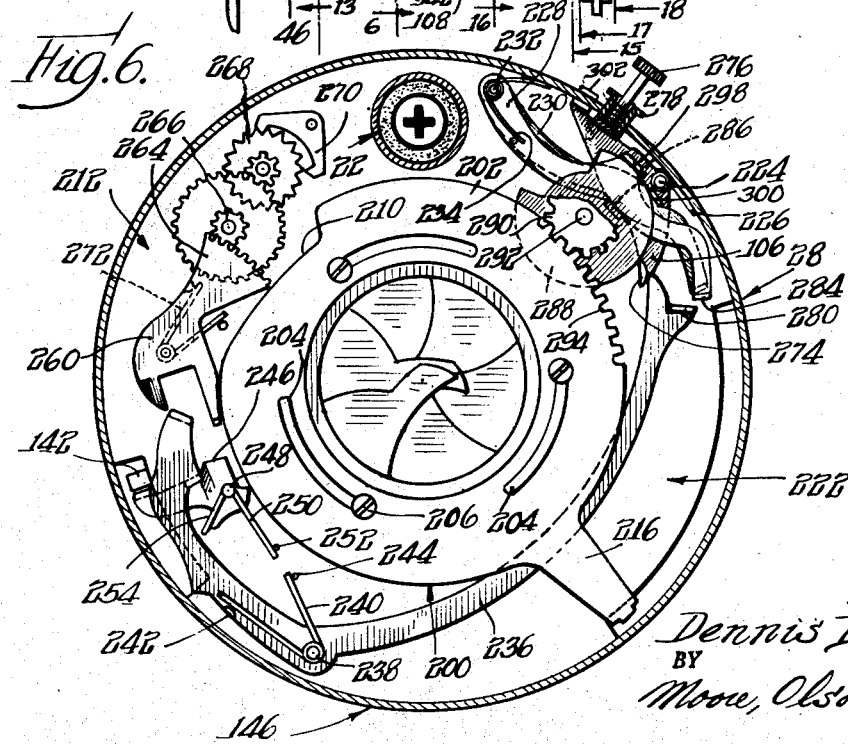
Fig. 6 is a view in vertical section taken substantially along the line 6—6 of Fig. 5.

Within the housing 126 is mounted a shutter 134 and a cam 136 which controls the size of the shutter opening by determining the extent of opening movement of the shutter. The shutter 134 consists of a shiftable ring or disk 138 journalled in the drum housing 126 and provided with a laterally projecting operating lever 140, having at its outer end a rearwardly bent operating lug 142 extending through an arcuate slot 144 (Fig. 7) in the periphery of the mounting plate 108 for engagement with, and operation by, the shutter operating and timing mechanism 146 (Fig. 6).

A plurality of blades or leaves 148, of a shape best seen in Figs. 11 and 19 to 21, are secured by pins or rivets 150, to a stationary ring 152, coaxial with, and smaller than, the ring 138 and mounted in the same plane as the ring 138. The ring 152 is fastened to the forward face of the mounting plate 108 by the pins or rivets 150, which also secure a ring 154 to the ring 152, but in spaced axial relation thereto so that the diaphragmatic levers 148 are mounted between the rings 152 and 154.

The blades 148 may take a number of different shapes. They are, however, each provided with an arcuate edge 156, the radius of which is equal to the radius of the largest desired shutter opening, and are provided with tongue portions 158 which are of such length as to overlap and exclude all light when the blades are in closed position. The inner edges of the tongues 158 provide arcuate extensions 160 of the arcuate edges 156 of the main bodies of the blades, and the blades are mounted on the rings 152 and 154 in the usual inter-leaved relationship. The outer ends of the blades extend beyond the ring 152 and over the ring 138. Headed pins or screws 162, carried by the shiftable ring 138, are received in enlarged holes or slots 164 in the outer ends of the blades 148 so that when the ring 138 is rotated in a clockwise direction, as seen in Figs. 8 and 19 to 21, the blades will be pivoted about the fixed pivot pins 150 to open position, and when the ring 138 is moved in a counter-clockwise direction, the blades will be pivoted about these pins in the opposite direction to a fully closed position, excluding all light from the lens tube 14. The ring 138 is urged in the clockwise direction, as seen in Figs. 8 and 19 to 21, by a pair of springs 166 (Fig. 14), received in radial recesses 168 of mounting plate 108 and mounted on pins 170 secured to the stationary ring 152. One end of each spring bears against a pin 172 mounted on the ring 152, and a pin 174 secured to the shiftable ring 138.

The ring 154 is provided with a notched annular flange 176 in which is journalled control cam 136, having an internal cam surface 178 for engagement by a lug 180 secured to one of the shutter blades 148. The lug 180 projects through a slot 182 in the internal margin of the ring 154. The control cam 136 has secured to, or formed integrally with it, a radially operating lever 184 which is resilient or flexible in a direction axially of the cam. This lever is provided on its forward face with a tooth or clutch element 186. Lever 184 projects out of the housing 126 through a slot 188 in the rim of the housing and forwardly from the plane of the cam so that the tooth 186 may engage the serrated edge 190 of the adjustable wheel or disk 192 (Figs. 1 to 5 and 8) of the exposure meter unit. The wheel 192 is journalled on the forward lens tube 130, and closes the forward end of the housing formed by the drum 26 and cylinder 28.

It should be noted that the internal cam surface 178 of the control cam 136 serves as an adjustable stop for the lug 180 of the shutter. Therefore, the angular position of the control cam 136 relative to the shutter blade mounting rings 152 and 154 determines the size of the exposure opening.

A shutter speed setter, or control, device 194 (Figs. 3, 5 and 8) comprises a segment 196, having a central hub portion 198 journalled on the forward lens tube 130, and a shutter speed control cam 200 (Figs. 3, 5 and 7) which consists of a ring 202, having arcuate slots 204 receiving headed mounting screws 206 (Fig. 3) threaded into angularly spaced openings in the mounting plate 108. The disk 202 is spaced from the mounting plate by spacing cylinders 208 mounted on screws 206 and interposed between the cam and the plate. The ring 202 is provided with an external cam surface 210 to control the setting of an interval timer 212, Fig. 6. It is also provided with an operating lever which consists of a portion 216 projecting radially from the ring 202, an axially extending portion 218 projecting through an arcuate slot 220 in the mounting plate 108, and an inwardly turned outer end portion 222 secured in any convenient manner to the segmental portion 196 of the shutter speed setter 194.

The shutter release 106, except for the pawl or tooth 102 on its outer end, is conventional in form and cooperates with substantially conventional shutter control or operating means 222, Figs. 6 and 7. Lever 106 is pivoted on a pin 224 to the rear face of the central mounting plate 108. It is urged in a clockwise direction by the usual spring 226 mounted on pin 224. The lever 106 cooperates with the usual pair of checking levers 228 and 230 which control the shutter for bulb and time exposures, respectively. These levers are pivoted on pin 232 secured to the rear face of the mounting plate 108. Each is urged in a counterclockwise direction, as seen in Fig. 6, by the usual spring 234 (one only being shown) mounted on the pin 232. The release lever 106 also cooperates with the usual tripping lever 236 journalled on a pin 238 secured to the rear face of the mounting plate 108 and urged in a counter-clockwise direction by a spring 240 mounted upon pin 238 and engaged at one end by the lug 242 of the lever 106, and at its other end by a fixed pin 244 secured to the mounting plate 108. The tripping lever 236 in turn cooperates with the usual shutter control lever 246 journalled on a pin 248 secured to the rear face of the mounting plate 108, and urged in a clockwise direction by a spring 250 mounted on the pin 248 and engaging a fixed pin 252 and a lateral lug 254 on the lever 246. The lever 246 at its outer end engages the axially projecting portion 142 of the shutter operating lever 140.

The lever 246 is moved in a counter-clockwise direction, as seen in Fig. 6, to release the lever 142, by means of a lateral lug 256 on the tripping lever 236. The lever 236 is also provided with an inturned end 258 seated between the furcations of a bifurcated lever 260 which constitutes the time or speed controlled lever of the timing mechanism 212. The extent of the setting of lever 260 is determined by the engagement of lateral lug 262 of the lever 260 with the external cam surface 210 of the control cam 200. The lever 260 is provided with a gear segment 264 which meshes with a gear 266, the gear being controlled by escapement wheel 268 under control of the escapement 270, and the lever is set and urged in a counter-clockwise direction by the usual spring 272. The cam 200, in determining the permissible rotation of the lever 260 in a counter-clockwise direction, determines the time required for the lever to be returned in a clockwise direction to the position at which it will release the lever 236. It thereby determines the time at which the lever 236, in rotating in a counter-clockwise direction will release the actuating lever 246, so that the latter will be rotated in a clockwise direction by the spring 250. The spring 250 is of greater force than the springs 166 which move the shutter blades to open position, and therefore, when it is permitted to return the lever 246 in a clockwise direction, that lever will, by engagement with the end 142 of the shutter lever 140, restore the shutter to closed position.

The tripping lever 236 is rotated in a clockwise direction by the lever 106 which, for that purpose, is provided with a lug 274 which engages the pointed end of the lever 236, but passes beyond and frees the lever 236 for return by the control timing mechanism 212 when the lever 236 has been rotated through a predetermined angle in a counter-clockwise direction. Lever 106 is rotated in a counter-clockwise direction by the usual spring returned, exposure button 276 mounted in the usual manner in the bushing 278 projecting through the cylinder 28, the button 276 engaging the handle 104 of lever 106.

In the taking of a bulb exposure the lever 236 is held against return movement by the checking lever 228, the end lug 284 of which engages in the usual manner the forward edge of a lateral lug 280 on the upper end of the lever 236. When the button 276 is released to complete a bulb exposure, the spring 226 rotates the lever 106 in a clockwise direction and through it moves to the checking lever 228, against the action of the spring 234, out of the path of the lever 236 to close the shutter.

In the taking of a time exposure the exposure button 276 must be depressed twice, the first depression opening the shutter, and the second depression closing the shutter. The lever 236 is held in shutter-opening position during the time exposure, by the end of the lever 230 which engages in the usual manner the forward edge of the lug 280 of the lever 236. The lever 230 is so shaped, in the usual manner, that when it is in checking engagement with the lever 236 it locks the lever 106 in a partially depressed position. On the second depression of the exposure button 276, the lever 106, which is provided with a lug 286 engaging the under surface of levers 228 and 230, moves the lever 230 out of engagement with the lever 236 so that the shutter is thereupon closed.

Levers 230 and 228 are rendered ineffective during the taking of instantaneous exposures by a cam 288, secured to a gear 290, journalled on a pin 292 carried by the mounting plate 108. The gear 290 meshes with gear teeth 294 formed on the periphery of the cam disk 200 so that the shutter speed setter 194, which determines the setting of cam disk 200, thereby determines the setting of cam 288 for instantaneous, bulb or time exposures.

The cam 288 consists of a disk having a relieved surface or arcuate recess 296, the unrelieved peripheral surface of the cam engaging the lateral lugs 298 and 300 of the bulb and time exposure control, checking levers 228 and 230, respectively, when the cam 288 is set for taking an instantaneous exposure. When the cam 288 is set for taking a bulb exposure the lug 298 is freed from the peripheral surface of the cam and moves into the arcuate notch 296, while the lug 298 is still restrained by engagement with the enlarged peripheral surface of the cam. When the cam 288 is set for the taking of a time exposure, both lugs 298 and 300 are freed from the surface of the cam for movement into the arcuate notch 296.

An internally threaded bushing 302, projecting through the central part 28 of the housing in axially spaced relation to the bushing 278, receives the usual cable release 304 which upon operation of the cable release button engages and depresses the arm 104 of the exposure control lever 106.

The shutter speed setter 194 also serves as an adjustable means measuring the light intensity, and for that purpose is provided with an arcuate slot 306 (Fig. 8) in its segmental portion 196, in which slot is mounted the light measuring filter 20. This light measuring filter 20 preferably comprises a polarizing filter having a uniform opacity section 308 and a clear section 310, the uniform opacity section 308 being utilized to measure light intensities for the making of instantaneous exposures, and the clear section 310 being utilized for the making of time and bulb exposures. The shutter speed setter and light measuring device 194 is provided with an operating or adjusting lever 312 integrally formed with, or secured to, the segmental portion 196. Preferably the lever 312 is formed or secured to a portion 314 joined at its base to the segmental portion 196, but separated along its sides by radial cuts 316 so that the portion 314 may be deflected laterally of the plane of the segment 196, but is sufficiently resilient to be returned into the plane of the segment when the lever 312 is released.

The lever 312 extends radially from the segment 196 and passes out of the housing cylinder 28 through an arcuate slot 318 (Fig. 7) which is in communication with axially directed slots 320, the surface of the cylinder adjacent the slots being inscribed with suitable shutter speed indicia 322 representing fractional parts of a second for the taking of instantaneous exposures. The longest slot 320, i. e., the one-fifth of a second slot, is also in communication with an arcuate slot 324, the surface of the cylinder adjacent slot 324 being provided with angularly spaced indicia B and T, representing bulb and time exposure settings.

The resiliently mounted lever 312 is provided on its forward face with a tooth 326 (Fig. 7) adapted to engage, when the lever is moved out of the slots 320 and 324 and into the slot 318, with the serrated or toothed edge 190 of the disk or wheel 192.

A time exposure guide 328 (Figs. 3, 5 and 8), having a disk portion 330 and a radial arm or segment 332, is journalled on the forward lens tube 130 adjacent the shutter speed setter 194, and also adjacent the disk or wheel 192, likewise journalled on the forward lens tube 130. The radial arm 332 is secured to, or formed integrally with, the disk 330 and is constructed of relatively thin, flexible sheet metal or other material possessing the necessary flexibility. The arm projects from the cylinder 28 of the housing through an arcuate slot 334 (Fig. 7), the edges of the cylinder along the slot having serrations or teeth 336 to engage a tooth 338, Fig. 3, carried by the rear face of the arm 332. The arm 332 is also provided on its forward face with a tooth 340 adapted to engage the serrations 190 of the wheel or disk 192.

The segmental arm 332 of the time exposure guide is provided adjacent its outer edge, which projects beyond the periphery of wheel 192, with suitable indicia 342 (Figs. 2 and 8) constituting a time exposure scale indicating the proper exposure times for the taking of time exposures at different shutter openings.

As previously mentioned, the setting lever 184 for the shutter opening control cam 136 extends from the shutter housing 126 through the arcuate slot 188. It also projects from the cylinder portion 28 of the outer housing through an arcuate slot 344 (Fig. 7), in communication with a deeper slot 346. The surface of the cylinder 28 along the edge of the slot 344, and the base of the slot 346, is inscribed with suitable indicia 348 (Fig. 4), constituting a scale of shutter openings indicating the position of the shutter opening control cam. The slot 344 is of such depth as to prevent disengagement of the lever from the wheel while the lever is moving along the slot, but the slot 346 is of sufficient depth to allow such disengagement when the lever is moved down into the base of the slot 346.

An arcuate lever 350, Fig. 12, is pivoted to the inner surface of the cylinder 28, as by a pin or rivets 352, Figs. 4, 17 and 18. At one end is a roller 354 which overlies the flexible arm 332 of the time exposure guide 328, so as to engage and move the arm forwardly when the lever 350 is moved in a clockwise direction, as seen in Fig. 4, and thereby causes the tooth 338 of the arm to be disengaged from the serrations 336, and the tooth 340 to engage with the serrations 190 of the wheel 192, thereby coupling the time exposure guide to the wheel 192. The other end of the lever 350 projects across the slot 346. Whenever the lever 184 of the shutter opening control cam is depressed into this slot, the lever 350 will be rotated clockwise and couple the time exposure guide to the wheel 192.

The wheel 192 constitutes primary adjusting means for measuring the light intensity, and for that purpose is provided with an arcuate slot 356 (Figs. 3 and 8) in which is mounted the light measuring screen 18 which consists preferably of a polarizing filter, the rotation of which, relative to the polarizing filter 20, varies the amount of light which is passed to the screen 22.

The polarizing filters 18 and 20 are so arranged that one effects an increase in the light transmission on clockwise rotation and a decrease on counter-clockwise rotation, while the other effects a decrease on clockwise rotation and an increase on counter-clockwise rotation. A cap 358 having an arcuate central portion and radial end arms circumscribes the top and sides of the slot 356 to exclude light other than the wanted light for the exposure meter. The wheel 192 is provided with indicia 360 (Figs. 4 and 8) constituting a film speed scale, as, for example, in Weston film speed rating units. The wheel is also provided with indicia 362 constituting a shutter opening scale. The scale 360 cooperates with the lever 184 to determine the proper setting of the shutter opening control cam for different film speed ratings, and the scale 362 cooperates with the scale 342 carried by the arm 332 of the time exposure guide, to determine the proper exposure times for the making of time exposures at different shutter openings. It should be noted that the exposure guide is shifted only when the lever 184 is depressed into the notch 346 and the wheel 192 rotated to change the film speed setting of the lever 184. The exposure guide is so positioned initially that whenever it is coupled to the wheel the largest shutter opening of scale 362 is aligned with the longest exposure time of scale 342.

The wheel 192 is held in assembled position by a ring 364 threaded on the end of the forward lens tube 130.

The control unit is used and operates as follows: At the time the film is loaded into the camera, the lever 184 is moved to, and depressed into, the notch 346, and the wheel 192 moved relatively thereto to position the proper film speed rating in alignment with the tooth on the lever. The lever is then released for recoupling to the wheel.

If it is desired to take an instantaneous exposure, the lever 312 of the shutter speed setting device 194 is moved, if necessary, to a position in which it is received in one of the notches 320 in the surface of the cylinder 28 of the external housing. In this position of the lever, the uniform opacity section 308 of the rear filter 20 of the exposure meter is aligned with the tri-density screen 22.

The wheel 192 is now moved, if necessary, to a position such that the tri-density pattern on the screen 22 may be distinctly seen through the viewing opening 12, or to a position in which the pattern on the screen is obscure. The disk is then again rotated in the opposite direction until the gray annulus 122 of the screen pattern just disappears. This change in light represents a given decrease in the amount of light, i. e., a change in the amount of light equal to two units on the ordinary Weston exposure meter. The shutter opening control cam 136 being coupled to the wheel is thus automatically moved to the proper shutter-opening position for the taking of the instantaneous exposure.

The scale 348 now indicates the shutter opening at which the camera has been set.

The necessary movement of the wheel 192 to determine the proper setting of the shutter opening control cam will, of course, depend upon the initial position of the rear polarizing filter 20, and that position in turn depends upon the angular setting of the shutter speed setting device 194. Accordingly, the shutter opening control having been set in the proper position to take an instantaneous exposure at whatever speed the device 194 may have been set, it is now necessary to adjust that device if another speed or time of exposure is desired or permissible. Assuming that it is desired to take a picture in 1/200 of a second, the lever 312 is moved axially, and laterally of the plane of the disk 198, to disengage the lever 312 from the notch 320 in which it is seated, and the lever 312 is then moved arcuately of the slot 318 until it is aligned with the slot 320 corresponding to the number 200 on the timing scale 322. When the lever is moved out of the notch 320 in which it was engaged, the tooth 326 engages the serrated edge of the wheel 192, and therefore, as the lever is moved arcuately along the slot 318, the wheel is turned with it and therefore the front filter 18 and the rear filter 20 are moved the same angular distance so that the amount of light transmitted through the filters is unchanged.

The lever 184 of the shutter opening control cam being coupled to the wheel 192, the shutter opening setting is automatically changed in accordance with the change in the setting of the shutter speed. It should be noted that the internal cam surface 178 of the control cam 136 is so shaped that the intervals between the aperture indicia and the speed indicia are of the same magnitude.

The exposure button 276, or the cable release, is now depressed in the usual manner to move the release lever 236 in a clockwise direction, thereby swinging the lever 246 in a counter-clockwise direction. This releases the lug 142 of the shutter control lever 140 and permits the shutter operating spring 166 to rotate the ring 138 of the shutter, thereby opening the shutter blades to the extent permitted by the engagement of the lug 180 with the cam surface 178 of the shutter opening control cam 136. Lug 274 of the shutter actuating lever 106 passing beyond the end of the lever 236, the latter is immediately released by lever 106 for return movement in a counterclockwise direction against the action of the spring 240. However, the return of the lever 236 is delayed by the timing mechanism 212, the time setting of which is determined, as previously described, by the setting of the shutter speed control cam 200 in dependence upon the shutter speed setting device 194. The proper fractional time interval having elapsed, the lever 236 is released by the timing mechanism and returns to its original position, permitting the lever 246 to be swung in a clockwise direction and engage the lug 142 of the shutter actuating lever 140 so as to move the shutter to closed position against the action of the shutter springs 166.

In the taking of a bulb exposure the shutter opening control lever 184 is first positioned to the proper film speed as before. However, the shutter speed setting device 194 is now rotated until it reaches the one-fifth of a second notch and then uncoupled from the wheel and the lever 312 moved along the arcuate slot 324 to the time or T position. In moving relative to the wheel from the one-fifth of a second position to the T position, the device 194 positions the clear section of the rear polaroid filter 20 in alignment with the viewing tube so that the range of measurement of weak light is increased and a proper shutter opening may be selected for a bulb exposure by a measurement of the light conditions. The light conditions are now measured as before. A reading is taken from scales 362 and 342, the aperture control lever moved, if necessary, to the position indicated for the chosen time interval, and the lever 312 moved back to B position.

The opening of the shutter is thereafter accomplished in the usual manner by depression and release of exposure button 276 or cable release 304, causing the shutter to be opened, lever 236 to be held in open position by the checking lever 230 and to be released therefrom when the shutter 106 is released, thereby closing the shutter, the time interval of exposure being guessed as accurately as possible.

In the taking of a time exposure, the shutter speed setter 194 is first moved into the lower end of the notch 324 corresponding to the time exposure or T position. In moving from the one-fifth of a second position to the time exposure position, the shutter speed setter 194 is uncoupled from the wheel 192 but the rear polaroid filter positioned with its clear section in alignment with the viewing tube. The wheel 192 is now rotated as before, to measure the light conditions. A direct reading of time and aperture is made from the timing scale 342 along the exposure guide and the shutter opening scale 362 on the face of the wheel 192 which together indicate the different permissible time exposure intervals for different selectable shutter openings. The time exposure setting and control device 85 is thereafter adjusted, by movement of the adjusting pin 94 arcuately of the slot 34, to expose at the lower end of the slot 34 the proper timing indicia 96 corresponding to the time interval thus determined by the scale 362. This movement of the time exposure setting and control device 85 effects a setting of the time exposure timer 46 and the device 85 is locked in adjusted position by the pawl 102 of the lateral lug 104 of the shutter release lever 106. The exposure button 276 on the cable release may now be pressed. The pawl 102 is thereby moved radially inward relative to the arcuate section 92 of the time exposure setting device 85 and released from the notches 98 on the inner edge of the arcuate section 92. The device 85 thereafter moves in a counter-clockwise direction, as seen in Fig. 13, at a rate determined by the time exposure timer 46. As the time exposure timing device 85 returns to its zero or initial position, the under surface of the cam lug 100 engages the upper surface of the lateral lug 104 of the shutter release lever 106 and depresses that lever for the second time, thereby freeing the shutter control tripping lever 236 so that the shutter is closed, as previously described, to terminate the time exposure automatically.

It should be noted that when the light intensity has been determined by rotating plate 192 the lever 184 will always be set at the aperture proper for the longest time interval of which the interval timing device is capable. Therefore, after the light intensity has been determined, if the lever 94 is raised to its fullest extent a properly timed time exposure will be made automatically.

A second embodiment of a time exposure scale is shown in Figs. 23, 24 and 25, wherein the time exposure guide plate 328, the lever 350 with its terminal roller 354, and the arcuate notch 334 in case 28 are eliminated. An arcuately bent metal plate 366 with an axially bent face 368 is attached by rivets or other suitable means to the shutter opening control lever 184 at a point so that it rotates inside case 28. Arcuate slot 346 in case 28 is widened to permit visualization of a portion of plate 366 and on this portion are inscribed suitable time indicia 370. A small block 372 with a bluntly pointed end is attached to the lever 184 above plate 366 to maintain the toothed element of lever 184 in engagement with wheel 192, except when the lever is brought opposite the deeper notch 346 for the purpose of disengaging lever 184 from wheel 192 in changing film rating setting.

In taking a time exposure, the shutter speed control lever 312 is moved to the T position, which aligns the clear portion of the back filter with the viewing screen. The combined density of the variable filters is now such that determination of light intensity will give an automatic calculation of the proper aperture for an exposure of a given duration, for instance eight seconds.

If a longer or shorter exposure is desired, a direct reading is made from time scale 370 and aperture scale 348, and any pair of aperture and time settings may be chosen.

If other than an eight second exposure is to be used the shutter opening control lever 184 is moved to the chosen setting on scale 348 and the shutter is opened for the required time, either by a "bulb" exposure, or by setting the time exposure timer and taking an automatically timed time exposure.

Since the automatic time exposure timer can be made to give a maximum automatic timing equal to the basic time interval used in calculating the exposure, if, after the light intensity has been determined by rotating wheel 192, the lever 94 of the timing device be elevated to its fullest extent a properly timed time exposure will be made automatically.

It will be obvious that changes may be made in the form, construction and arrangement of the parts without departing from the spirit of the invention or sacrificing any of its advantages, and the right is hereby reserved to make all such changes as fairly fall within the scope of the following claims.

What I claim is:

1. In a photographic camera, the combination of a single shutter, an adjustable shutter opening control for determining the extent of opening movement of the shutter, a speed control member for determining the time between the opening and closing of the shutter, exposure metering means comprising a screen having a tri-density pattern for determining a standard light intensity, a first polarizing filter adjustably mounted to vary the transmission of light to said screen, means connecting said first filter to said shutter speed control means to vary the speed of the shutter in dependence upon the setting of said filter, a second polarizing filter cooperating with the first to vary the transmission of light to the screen, means adjustably connecting said second filter to said shutter opening control means for movement therewith to set said control means for the proper size of shutter opening in dependence upon the setting of said second filter and for adjustment relative thereto in accordance with the film speed rating, means automatically connecting the first filter to the second filter on adjustment of the first filter to change the shutter speed setting, a time exposure guide, means controlled by said shutter opening control means for connecting said guide to said second filter on adjustment of the connection of shutter opening control means relative to the second filter in accordance with the film speed rating and releasing the guide from the second filter on adjustment relative to the shutter opening control means, cooperating shutter opening and time exposure scales on said time exposure guide and said second filter for determining on adjustment of the second filter when the guide is released therefrom the proper time exposures for different shutter openings, time exposure timing means pre-settable for different time intervals, means for opening the shutter, means for holding the shutter in open position to take a time exposure, means operated by the time exposure timing means for releasing the timing means to terminate the exposure and means operatively controlled by said shutter speed control means for selectively rendering said shutter holding means effective to take a time exposure and ineffective to take an instantaneous exposure.

2. A photographic camera having a rear lens mounting tube, a housing comprising a drum mounted on said lens tube and a cylinder open at both ends and mounted on the forward end of said drum, a partition in said cylinder normal to said lens tube, said partition having an opening coaxial with said lens tube and a translucent screen eccentric to said lens tube, a viewing tube aligned with said screen and in communication with an aligned opening in the wall of the drum normal to the lens tube, a shutter mounted on said partition for controlling the passage of light through the partition opening to the rear lens tube, a forward lens mounting tube mounted on said partition, a wheel on the forward end of said forward lens tube and substantially closing the forward end of said cylinder, a shutter opening control cam mounted in said housing for cooperation with said shutter to determine the extent of opening of the shutter, said wheel having notches in the periphery, said control cam having an operating member extending from said housing and provided with a toothed portion for engaging notches in the periphery of said wheel, said operating member being yieldably mounted for movement parallel to the axis of the wheel for uncoupling from said wheel and being normally urged into coupling engagement with the wheel, a shutter speed control means including a speed control cam mounted in said housing, said means including an operating device projecting from said housing and having a toothed portion for engagement with other notches in the periphery of said wheel, said device being mounted for movement parallel to the axis of the wheel for coupling to the wheel and being normally uncoupled from said wheel, said wheel having a light varying portion aligned with the screen and said screen having a variable density pattern to determine a standard of light intensity, said wheel having a film speed rating scale cooperating with the toothed portion of the operating member of the shutter opening control cam to govern the relative adjustment of said cam and said wheel in accordance with the film speed ratings, said cylinder having a scale cooperating with the operating member of the shutter speed control means to govern the speed setting of said shutter speed control means when said operating device is coupled to the wheel.

3. In a photographic camera as set forth in claim 2, shutter operating means mounted in said housing, means cooperating with said operating means and said shutter speed control means for correctly setting said shutter operating means for the taking of an instantaneous exposure or a time exposure, said shutter operating means including an operating member projectable from the housing and depressible once to take an instantaneous exposure and twice to take a time exposure, time exposure timing means including a pre-settable timing member having an adjusting member projecting from said housing, means operatively connecting the shutter operating means to the time exposure timing means to initiate the operation of said timing means on first depression of the operating member of the shutter operating means, means controlled by said time exposure timing means for automatically depressing said operating member a second time upon passage of the predetermined time for which said timing means is pre-set.

4. In a photographic camera as set forth in claim 2, a time exposure guide comprising a member journaled on the forward lens mounting tube and having an operating portion extending out of the housing, said operating portion being yieldable for movement parallel to the axis of the wheel and having teeth on its opposite surfaces, the teeth on its forward surface being adapted to engage other notches in the periphery of the wheel to couple the time exposure guide to the wheel during adjustment of the wheel when the shutter opening control cam is uncoupled from the wheel, the cylinder of the housing having an arcuate edge with notches to engage a tooth on the rear surface of the operating portion of the guide to secure said guide against movement when it is uncoupled from the wheel and the wheel rotated to measure the light intensity, said wheel and said time exposure guide having cooperating shutter opening and time exposure scales to indicate on adjustment of the wheel to measure light intensity proper shutter openings for different time exposures.

5. In a photographic camera, the combination of an adjustable shutter, light measuring means comprising a pair of cooperating shiftably mounted filter members, one of said filter members having sections of different ranges of light transmissibility, the other filter member being constructed to vary the light transmitted in predetermined ratio to the degree of movement of said member, shutter speed control means for selectively setting the shutter for the taking of instantaneous exposures of different speeds and for the taking of time and bulb exposures and operatively connected to said one filter member for selectively rendering different light transmission ranges of said filter member effective on setting of the shutter for the taking of instantaneous, time or bulb exposures, shutter opening control means operatively connected with the other filter member for setting the shutter for different size openings in accordance with the movement of said other filter member to measure the light intensity.

DENNIS B. DORSEY.

(References on following page)

REFERENCES CITED

The following references are of record in the file of this patent:

UNITED STATES PATENTS

| Number | Name | Date |
|---|---|---|
| 885,142 | Brownell | Apr. 21, 1908 |
| 1,623,998 | Cooke | Apr. 12, 1927 |
| 2,112,701 | Leitz | Mar. 29, 1938 |
| 2,194,152 | Riszdorfer | Mar. 19, 1940 |
| 2,209,156 | Fischer | July 23, 1940 |
| 2,256,208 | Leitz et al. | Sept. 16, 1941 |
| 2,278,338 | Tonnies | Mar. 31, 1942 |
| 2,321,420 | Rath | June 8, 1943 |

FOREIGN PATENTS

| Number | Country | Date |
|---|---|---|
| 329,506 | Italy | Sept. 11, 1935 |
| 446,656 | Great Britain | May 4, 1936 |